July 13, 1948.  J. C. THOMPSON  2,445,090
PISTON RING
Filed Jan. 9, 1947  2 Sheets-Sheet 1
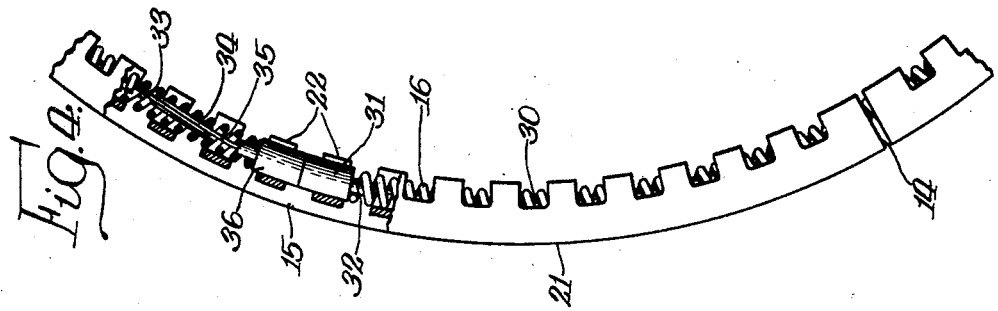
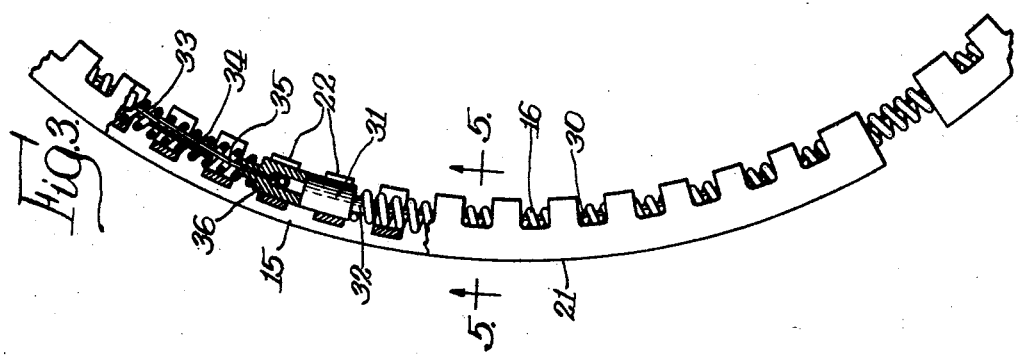
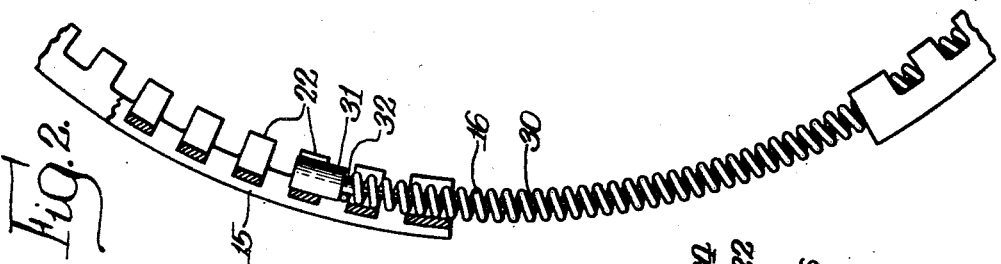
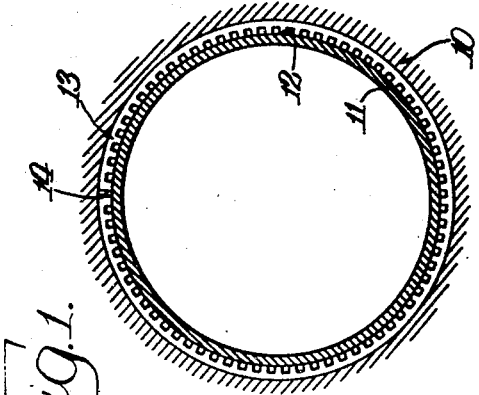
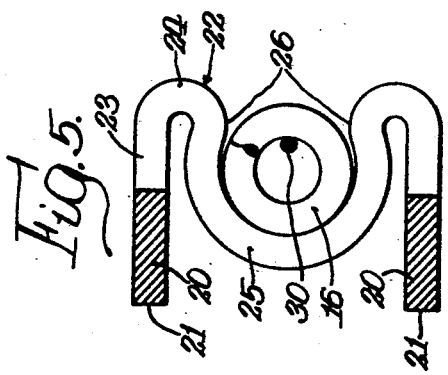
INVENTOR.
Joseph C. Thompson,
BY
Davis, Lindsey, Smith & Shonts
Attys.

July 13, 1948.  J. C. THOMPSON  2,445,090
PISTON RING
Filed Jan. 9, 1947  2 Sheets-Sheet 2
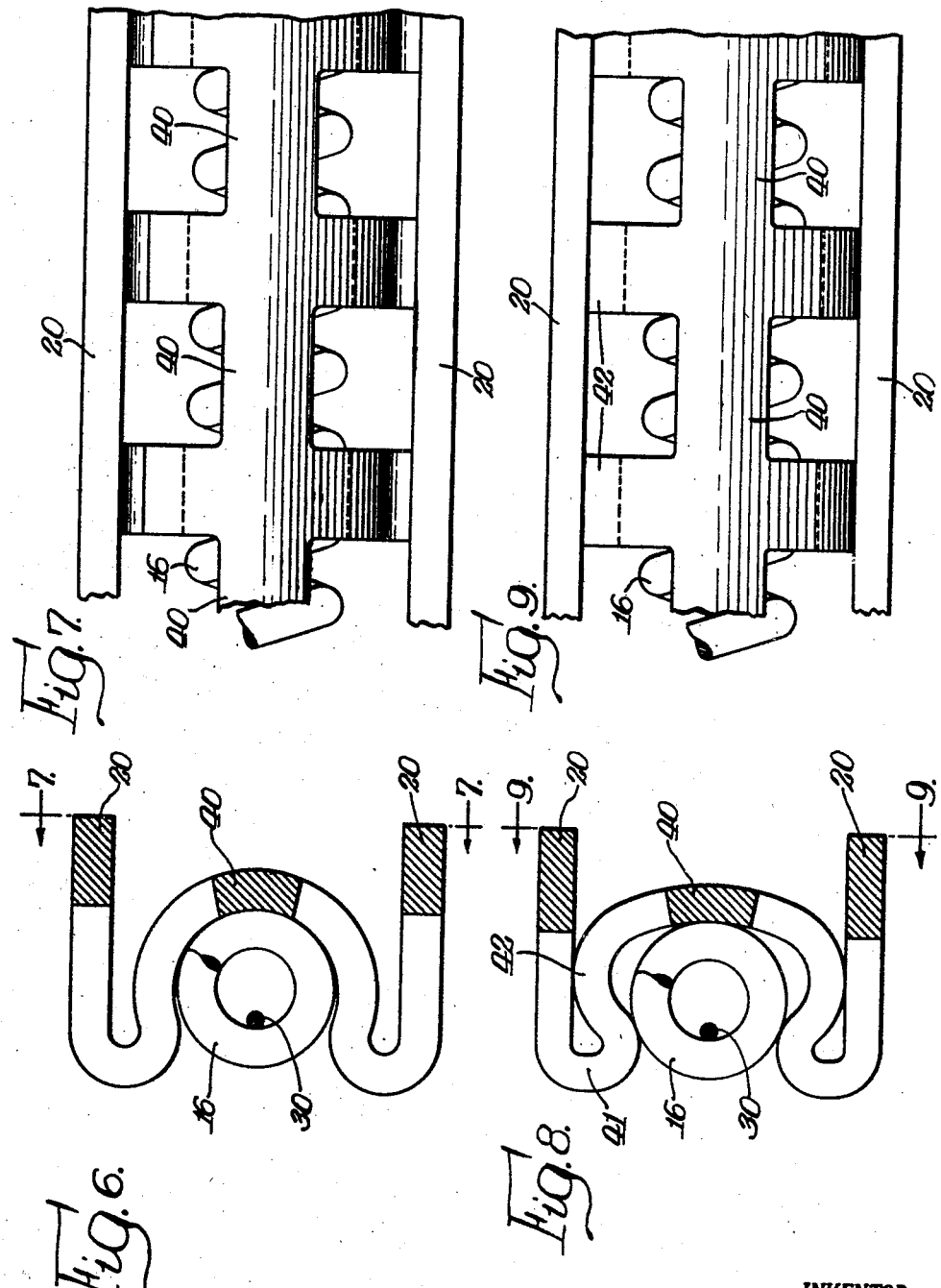

Patented July 13, 1948

2,445,090

UNITED STATES PATENT OFFICE 2,445,090

PISTON RING

Joseph C. Thompson, Hagerstown, Ind., assignor to Perfect Circle Corporation, a corporation of Indiana Application January 9, 1947, Serial No. 720,946

13 Claims. (Cl. 309—29)

The invention relates generally to piston rings and more particularly to a piston ring for use in an internal combustion engine.

The general object of the invention is to provide a novel piston ring assembly comprising a ring member and a spring adapted to be seated in a groove in the inner periphery of the ring member and tending to expand the ring member, the latter being shaped so that the spring is disengageably retained in the groove and consequently cannot accidentally become separated from the ring member.

More specifically, it is an object to provide a piston ring assembly comprising a ring member of sheet metal construction comprising a pair of cylinder-engaging flanges connected at their inner periphery by web members forming a groove to receive a coiled spring, the groove being slightly more than semicircular in cross section providing an opening of less width than the diameter of the spring, thus retaining the spring in the groove.

Another object is to provide a novel piston ring assembly comprising a ring member and a coiled spring seated in a groove in the ring member, the spring being held partially compressed without unduly expanding the ring member before the ring is inserted in the cylinder so that, when the ring is inserted in the cylinder, the spring will exert sufficient expanding pressure on the ring, the spring-receiving groove in the ring member being shaped so that the spring cannot accidentally be dislodged therefrom.

A further object is to provide a novel piston ring assembly comprising a ring member and a coiled spring for expanding the ring member, the latter comprising a pair of cylinder-engaging flanges interconnected by webs formed to provide a spring-receiving groove shaped to prevent the spring from being accidental dislodged therefrom, the webs being integrally connected at the bottom or central portion of the groove to provide a smooth seat for the spring permitting it to readily shift circumferentially of the ring member.

Still another object is to provide a novel piston ring assembly comprising a ring member and coiled spring for expanding the ring member, the latter comprising cylinder-engaging flanges interconnected by webs shaped in their intermediate portions to provide a spring-receiving groove adapted to retain the spring therein so that it cannot be accidentally dislodged, the groove-forming portions of the webs also being shaped so as to provide direct support for the flanges.

Other objects and advantages will become apparent from the following description taken in connection with the accompanying drawings, in which:

Figure 1 is a transverse, fragmentary, sectional view of a cylinder and piston, taken through a groove in the piston, in which is positioned a ring embodying the features of the invention.

Fig. 2 is an enlarged view, partially in section, of a portion of the ring shown in Fig. 1 and showing the ring when expanded to slip over the piston.

Fig. 3 is a view similar to Fig. 2 but showing the ring when placed in the groove but before the piston is placed in the cylinder.

Fig. 4 is a view similar to Figs. 2 and 3 but showing the ring after being placed in the cylinder.

Fig. 5 is an enlarged sectional view of the ring taken on the line 5—5 of Fig. 3.

Fig. 6 is a view similar to Fig. 5 but showing a modified form of ring.

Fig. 7 is an edgewise view taken on the line 7—7 of Fig. 6.

Fig. 8 is a view similar to Figs. 5 and 6 but showing another modified form of ring.

Fig. 9 is an edgewise view taken on the line 9—9 of Fig. 8.

The present invention contemplates a piston ring of the general type comprising a ring member and a spring for expanding the ring member into tight engagement with the cylinder wall. The ring member is preferably of sheet metal construction, of a highly flexible character so that the spring, which bears outwardly against the ring member throughout the circumference, will cause the ring member to hug closely to the cylinder wall even though the cylinder wall is worn slightly out of round. The ring member is formed from a strip of sheet metal to provide a pair of axially spaced flanges having their outer edges adapted to engage the cylinder wall, with the flanges integrally connected at their inner edges by webs. The latter are bent or bowed into the space between the flanges to provide an inwardly opening groove in which the spring is seated. The spring in this instance is a coiled spring and bears outwardly against the web members to hold the flanges in engagement with the cylinder wall.

In order to provide outward pressure against the ring member, the spring is circumferentially compressed and, should the spring be accidentally dislodged from the groove in the ring member, it is difficult to replace the spring therein. For this reason, the webs of the ring member are so formed as to retain the spring in the groove to prevent its being accidentally dislodged. Such result is obtained, in the present instance, by so forming the groove provided by the webs, that the opening of the groove is slightly less in width than the diameter of the coils of the spring. The spring may be inserted in the groove by threading it endwise in the ring member at the gap in the ring.

The present invention also contemplates the use of a spring which is placed under partial compression before it is inserted in the groove in the ring member so that, when the ring is compressed by placing it within the cylinder, the spring is consequently further compressed. The spring thus exerts a strong pressure outwardly on the ring member to cause it to function properly in controlling the oil distribution on the cylinder wall. The partial compression of the spring prior to being placed in the cylinder is so attained that there is no tendency to cause the ring member, when it is free of the cylinder, to expand beyond the diameter of the piston. While the ring may be expanded manually beyond such diameter to permit it to be placed in the groove in the piston, it will maintain an inside diameter that is less than the piston diameter so that the ring will not fall out of the groove. Installation of the rings in the piston is thus greatly facilitated. The partial compression of the spring, however, makes it still more desirable to provide for retention of the spring in the groove against accidental dislodging since the compression under which the spring is held tends to cause the spring to jump out of the groove if there is any force tending to cause dislodgement.

In Fig. 1, I have shown fragmentarily a cylinder 10 and a piston 11 having a ring-receiving groove 12. Mounted in the groove 12 is a ring, indicated generally at 13, having ends providing a gap 14. The ring 13 comprises a ring member 15 (see Figs. 2-5) and a spring 16. As heretofore mentioned, the ring member is of sheet metal construction and comprises a pair of flanges 20 (see Fig. 5), the outer edges 21 of which are adapted to engage the walls of the cylinder 10. The flanges 20 are in axially spaced arrangement and are integrally connected by means of webs, indicated generally at 22, the webs being circumferentially spaced from each other so that the ring member is thereby of a highly flexible character.

Each web 22 preferably extends inwardly from the flanges in the planes thereof, as at 23, and then is reversely bent as at 24 to extend between the flanges in generally circular form, indicated at 25, to provide a groove in which the spring 16 is seated. The spring 16 thus bears outwardly against the central portions of the web members, tending to expand the ring.

Since the spring 16 is under compression, when the ring is in the cylinder or is being placed in the cylinder, such compression will tend to cause the spring to jump out of the groove when anything occurs tending to accidentally dislodge the spring. For this reason, the webs are so shaped as to prevent the spring from being accidentally dislodged. In the specific form shown in the drawings, the groove provided by the curved portion 25 of the webs is slightly more than semicircular in form so that the opening of the groove, indicated at 26, is slightly less in width than the diameter of the coils of the spring. The spring is thus definitely retained within the groove and cannot be dislodged. To place the spring in the groove, it may be threaded therein at the ends of the ring member providing the gap 14. The groove, however, is of sufficient diameter so that the spring may freely shift within the groove in expanding the ring member.

Retention of the spring against accidental dislodgment is particularly desirable in a ring where the spring is held under partial compression before being inserted into the cylinder. Such partial compression, because of the further compression that the spring undergoes when being inserted into the cylinder, provides for sufficiently strong expansive pressure on the ring member to cause the ring to function properly under varying conditions. In the present instance, the partial compression is attained by flexible means such as a wire 30 of predetermined length extending through the spring and having its ends fixed to the ends of the spring. Thus, as shown in Figs. 2, 3 and 4, one end of the spring is anchored in a thimble 31 having a diameter substantially equal to the coil diameter of the spring and against which the end of the spring abuts. To hold the thimble 31 in alignment with the end of the spring, the thimble is provided with a stem 32 of reduced diameter fitting within the end coils of the spring. The other end of the wire 30 is formed into a hook 33 adapted to be engaged by a similar hook 34 formed on a short piece of wire 35. The latter is provided with a thimble 36 similar in construction to the thimble 31 and engaging the other end of the spring.

The wire 30 thus limits the circumferential length to which the spring 16 can expand. However, the ends of the spring can be separated to provide for further expansion of the ring manually when the ring is being placed over the piston. Such condition of the parts is shown in Fig. 2 of the drawings, the ends of the ring member which provide the gap being widely separated to provide the necessary diameter to slip over the piston. In Fig. 3, I have illustrated the condition of the parts after the ring has been placed in the groove of the piston but before the piston has been placed in the cylinder. The length of the wires 30 and 35 is such that the thimbles 31 and 36 will be placed in abutment with each other when the ring member has an inside diameter that is less than the piston diameter to hold the ring in the groove. The ring thus will of its own resilience remain within the piston groove. This greatly facilitates, as is obvious, the placing of the piston within the cylinder. In Fig. 4, I have shown the condition of the parts after the piston is placed within the cylinder. In this instance, the ring member has been closed to provide the small gap 14 between the ends thereof. The wires 30 and 35, which have a combined length providing the diameter shown in Fig. 3, are permitted to slide relative to one another at their hook portions 33 and 34. The wires thus exert no pressure on the spring when the ring is in the cylinder, and the spring is free to shift as much as necessary to hold the flanges 20 of the ring member in tight engagement with the cylinder wall.

With the spring held under partial compression when the ring is being placed into a groove in the piston and when the piston is being placed in the cylinder, the forming of the spring-receiving groove in the webs so that the spring cannot be dislodged therefrom is particularly desirable since it is during handling of this character that there is greater chance of the spring being dislodged.

In the modified form shown in Figs. 6 and 7, I have shown a ring member providing a spring-receiving groove of susbtantially the same shape as shown in Fig. 5. I have also shown the spring held under partial compression prior to being inserted in the cylinder by means of the wire 30. With such partial compression of the spring and the consequent greater compression when the ring is placed in the cylinder, it is desirable to provide as smooth a seat as possible for the spring within the groove formed by the webs, so that the spring can readily shift circumferentially without any of its turns or coils catching on the edges of the webs. To this end, I integrally connect the webs by circumferentially extending portions 40 located at the bottom or central portion of the groove against which the spring 16 bears. Thus, a smooth, continuous seat is provided for the spring throughout the circumference of the ring member, and the spring can thereby shift freely relative to the ring member during its expansion and contraction.

In the modified form shown in Figs. 8 and 9, I have illustrated a construction which is similar to that shown in Figs. 6 and 7 but in which additional support for the flanges 20 is provided by the intermediate or groove-forming portion of the webs. Thus, the intermediate portion of each web, after being bent reversely as at 41, then flares outwardly as at 42 to bear against the portions of the web closely adjacent the inner edges of the flanges 20. The portions 42 of the webs thus tend to stiffen the flanges 20 against relative axial movement. The intermediate portions of the webs provide a generally circular spring-receiving groove and are preferably integrally connected by portions such as the portions 40 shown in Figs. 6 and 7. The reversely bent portions 41 are spaced from each other axially a distance less than the coil diameter of the spring so that the spring is retained within the groove provided by the webs.

I claim:

1. A piston ring assembly comprising a ring member having an annular groove opening from its inner periphery, and a coiled spring seated in said groove for expanding the ring member, the opening of said groove being slightly less in width than the diameter of said spring to retain the spring in the groove against accidental dislodgment.

2. A piston ring assembly comprising a ring member and a coiled spring of annular form for radially expanding the ring member, the latter having an annular spring-receiving groove opening from its inner periphery, the groove being generally circular in cross section and of a diameter at least equal to the diameter of the coils of the spring, and the opening of the groove being less than said coil diameter whereby the spring will be prevented from being accidentally dislodged from the groove.

3. A piston ring assembly comprising a ring member having a groove in its inner periphery, and a coiled spring seated in said groove for expanding the ring member and being circumferentially shiftable in said groove to effect such expansion, said ring member being shaped to prevent the spring from being accidentally dislodged from the groove without interfering with circumferential shifting of the spring.

4. A piston ring assembly comprising a sheet metal ring member comprising a pair of axially spaced cylinder-engaging flanges and webs connecting the inner edges of said flanges, said webs being outwardly bowed to form an inwardly opening circumferentially extending groove, and a coiled spring positioned in said groove and bearing against said webs to expand the ring member, said webs in their bowed portions providing an opening into said groove of a width less than the coil diameter of said spring whereby the spring will be prevented from being accidentally dislodged from said groove.

5. A piston ring assembly comprising a sheet metal ring member comprising a pair of axially spaced cylinder-engaging flanges and webs connecting the inner edges of said flanges with their intermediate portion bowed outwardly between the flanges to form a groove opening from the inner periphery of the ring, and a coiled spring positioned in said groove and bearing outwardly on said webs to expand the ring member, said spring having a coil diameter greater than the width of the opening into said groove whereby the spring is retained in the groove.

6. A piston ring assembly comprising a sheet metal ring member comprising a pair of axially spaced cylinder-engaging flanges and webs connecting the inner edges of said flanges, said webs being outwardly bowed to provide an inwardly opening groove, a coiled spring seated in said groove for expanding the ring member, and means for holding the spring under partial compression when the ring is out of the cylinder without expanding the ring beyond a predetermined size whereby the spring exerts a strong expanding pressure when the ring is in the cylinder, the width of the opening of the groove being less than the coil diameter of the spring to retain the spring in the groove.

7. A piston ring assembly comprising a sheet metal ring member comprising a pair of axially spaced cylinder-engaging flanges and webs connecting the inner edges of said flanges, said webs being outwardly bowed to provide an inwardly opening groove, a coiled spring seated in said groove for expanding the ring member, and flexible means of predetermined length extending through the spring and engaging the ends of the spring to hold it under partial compression when the ring is out of the cylinder without expanding the ring beyond a predetermined diameter whereby the spring exerts a strong expanding pressure when the ring is in the cylinder, the opening of the groove being less in width than the coil diameter of the spring to prevent the spring from being accidentally dislodged.

8. A piston ring assembly comprising a sheet metal ring member comprising a pair of axially spaced cylinder-engaging flanges and webs connecting the inner edges of said flanges, said webs being outwardly bowed to provide an inwardly opening groove, a coiled spring seated in said groove for expanding the ring member, said webs being integrally connected at the bottom or central portion of the groove to provide a smooth seat for the spring to permit it to readily shift circumferentially of the ring member and being so bowed as to provide an opening for the groove of less width than the coil diameter of the spring to retain the spring in the groove.

9. A piston ring assembly comprising a sheet metal ring member comprising a pair of axially spaced cylinder-engaging flanges and webs connecting the inner edges of said flanges, said webs being outwardly bowed to provide an inwardly opening groove, a coiled spring seated in said groove for expanding the ring member, said webs being circumferentially spaced from each other but having circumferentially extending portions at the bottom or central portion of the groove integrally connecting the webs and providing a smooth seat for the spring, the bowing of the webs providing an opening for the groove having a width less than the coil diameter of the spring to prevent the spring from being accidentally dislodged from the groove.

10. A piston ring assembly comprising a ring member comprising a pair of axially spaced cylinder-engaging flanges, and circumferentially spaced webs connecting said flanges, the webs being bowed to provide a groove, and a coiled spring seated in said groove and bearing outwardly on said webs to expand the ring member, said webs being integrally connected at the bottom or central portion of the groove to provide a smooth, continuous seat for the spring permitting it to readily shift circumferentially of the ring member.

11. A piston ring assembly comprising a ring member comprising a pair of axially spaced cylinder-engaging flanges, and circumferentially spaced webs connecting said flanges, the webs being bowed to provide a groove, a coiled spring seated in said groove and bearing outwardly on said webs to expand the ring member, said webs being integrally connected at the bottom or central portion of the groove to provide a smooth, continuous seat for the spring permitting it to readily shift circumferentially of the ring member, and means for placing the spring under partial compression before insertion into the cylinder whereby further compression of the spring by insertion of the ring into the cylinder causes the spring to exert a strong expanding pressure on the ring member.

12. A piston ring assembly comprising a ring member comprising a pair of axially spaced cylinder-engaging flanges, and webs integrally connecting said flanges, said webs extending inwardly from the inner edges of said flanges in the planes thereof and having their central portions bowed outwardly between said planes to provide a groove, and a coiled spring seated in said groove, the bowing of said central portions being such as to provide an opening for the groove of less width than the coil diameter of the spring to retain the spring in the groove and providing contact of the central portions of the webs with the portions of the webs adjacent the flanges to provide support in an axial direction for said flanges.

13. A piston ring assembly comprising a ring member comprising a pair of axially spaced cylinder-engaging flanges, and webs integrally connecting said flanges, said webs being bowed between the flanges to provide a groove, and a coiled spring seated in said groove, the bowed portions of the webs having an axial width equal to the space between said flanges to provide support for the flanges in an axial direction.

JOSEPH C. THOMPSON.